(12) United States Patent
Xue et al.

(10) Patent No.: US 10,843,234 B2
(45) Date of Patent: Nov. 24, 2020

(54) WHEEL CLEANING DEVICE

(71) Applicant: CITIC Dicastal CO., LTD, Qinhuangdao (CN)

(72) Inventors: Bowen Xue, Qinhuangdao (CN); Xueqiang Li, Qinhuangdao (CN); Jiandong Guo, Qinhuangdao (CN)

(*) Notice: Subject to any disclaimer, the term of this patent is extended or adjusted under 35 U.S.C. 154(b) by 101 days.

(21) Appl. No.: 16/404,379

(22) Filed: May 6, 2019

(65) Prior Publication Data
US 2020/0009618 A1    Jan. 9, 2020

(30) Foreign Application Priority Data
Jul. 4, 2018   (CN) .......................... 2018 1 0722828

(51) Int. Cl.
*B08B 3/02*    (2006.01)

(52) U.S. Cl.
CPC ................................. *B08B 3/022* (2013.01)

(58) Field of Classification Search
CPC ....................................................... B08B 3/022
See application file for complete search history.

(56) References Cited

U.S. PATENT DOCUMENTS

2015/0273493 A1* 10/2015 Xue ........................ B21H 1/10
239/224

* cited by examiner

*Primary Examiner* — Jason Y Ko
(74) *Attorney, Agent, or Firm* — Calfee, Halter & Griswold LLP (57) ABSTRACT

The present application discloses a wheel cleaning device comprises a lifting rotating system, a central hole cleaning system, a cleaning system for inner rim and back cavity, a synchronous clamping drive system, an outer rim cleaning system, and a bolt hole cleaning system, etc. The device may not only separately clean the center hole, the bolt hole, the inner rim and the outer rim of the wheel, but also may regulate the position and the angle of each nozzle according to the diameter and the height of the wheel.

1 Claim, 4 Drawing Sheets

WHEEL CLEANING DEVICE

CROSS-REFERENCE TO RELATED APPLICATIONS

This application claims priority to Chinese Patent Application No. 201810722828.6, filed on Jul. 4, 2018, which is hereby incorporated by reference in its entirety.

TECHNICAL FIELD

The application relates to a cleaning device, in particular to a wheel cleaning device.

BACKGROUND ART

In the machining production process of aluminium alloy wheel, due to the use of cutting fluid, some aluminium scraps and emulsifiers will remain in the center hole, bolt hole, inner rim, back cavity and outer rim of the wheel after the process is completed; these parts of the wheel must be cleaned before airtight measurement and dynamic balance measurement, otherwise these residual aluminium scraps and emulsifiers will not only affect the measurement results, but also have a great influence on the life and stable operation of the measuring device. Therefore, there is a need for an automatic device to automatically clean the above parts of the wheel, and the position and angle of the nozzle can be adjusted automatically for wheels with different diameters and heights to achieve better cleaning effect.

SUMMARY OF THE INVENTION

The object of the application is to provide a wheel cleaning device, which may not only respectively clean the center hole, the bolt hole, the inner rim and the outer rim of the wheel, but also may adjust the position and the angle of each nozzle according to the diameter and the height of the wheel.

In order to achieve the above object, the technical solution of the present application is as follows: wheel cleaning device, is composed of a frame, a first lower servo motor, lower guiding pillars, lower guiding sleeves, a lower fixing plate, a first pulley, a first synchronous belt, a second pulley, a lower lifting plate, a first lower shaft, a first lower bearing seat, a first servo electric cylinder, a lifting frame, a second lower servo motor, a second lower shaft, a second lower bearing seat, first lower nozzles, a first lower rack, a first lower gear, a first lower guiding rail, a seventh lower servo motor, a first lower sliding plate, a third lower servo motor, a lower side plate, a third lower bearing seat, a third lower shaft, a lower rotating plate, a fourth lower servo motor, a second lower guiding rail, a fifth lower servo motor, a second lower sliding plate, a fourth lower shaft, a fourth lower bearing seat, a second lower nozzle, a lower turning plate, a lower transition plate, a sixth lower servo motor, a second lower rack, a second lower gear, a second cylinder, an upper fixing plate, first upper racks, an first upper guiding rail, a left sliding plate, left bearing seats, left shafts, V-type rollers, an upper vertical plate, a second upper guiding rail, a first upper sliding plate, first upper nozzles, a second upper rack, an upper gear, a first upper servo motor, a third upper guiding rail, a third upper gear, a third upper rack, a first upper rotating plate, a second upper servo motor, a transition block, a second upper rotating plate, a first upper shaft, a first upper bearing seat, an upper lifting plate, upper guiding pillars, upper guiding sleeves, a third pulley, a third upper servo motor, a second synchronous belt, a fourth pulley, second servo electric cylinders, second upper nozzles, a second upper shaft, an second upper bearing seat, a second upper sliding plate, a fourth upper guiding rail, a fourth upper servo motor, fourth upper racks, a fourth upper gear, a fifth upper servo motor, a first upper gear, right shafts, right bearing seats, a right sliding plate, a sixth upper servo motor and first cylinders.

The lower lifting-rotating system includes that: the two first cylinders and the four lower guiding sleeves are fixed below the lower fixing plate; the output ends of the first cylinders are hinged with the lower part of the lower lifting plate; the four lower guiding pillars matched with the lower guiding sleeves are fixed below the lower lifting plate; the first lower servo motor is fixed below the lower lifting plate through a transition flange, and the output end of the first lower servo motor is fixed with the second pulley; the first lower bearing seat is fixed on the top of the lower lifting plate; the first lower shaft is mounted inside the first lower bearing seat through a bearing; the lower end of the first lower shaft is fixed with the first pulley; and the first pulley and the second pulley are connected by the first synchronous belt.

The central hole cleaning system includes that: the first servo electric cylinder is fixed at the central part of the first lower shaft, and the output end of the first servo electric cylinder is connected with the bottom plate of the lifting frame; the second lower bearing seat is fixed above the top plate of the lifting frame; the second lower shaft is mounted inside the second lower bearing seat through a bearing; the second lower servo motor is fixed below the top plate of the lifting frame, and the output end of the second lower servo motor is connected with the lower end of the second lower shaft; and the two symmetrical first lower nozzles are fixed on the top of the second lower shaft.

The cleaning system for inner rim and back cavity includes that: the first lower sliding plate is mounted on the left side of the first lower shaft through the first lower guiding rail; the first lower rack is also fixed on the left side of the first lower shaft; the seventh lower servo motor is fixed on the right side of the first lower sliding plate, and the output end of the seventh lower servo motor is fixed with the first lower gear; the first lower gear is meshed with the first lower rack; the lower side plate is fixed on the left side of the first lower sliding plate; the third lower bearing seat is fixed on the left side of the lower plate; the third lower shaft is mounted inside the third lower bearing seat through a bearing; the third lower servo motor is fixed on the right side of the lower plate, and the output end of the third lower servo motor is connected with the right side of the third lower shaft; the lower rotating plate is fixed on the left side of the third lower shaft; the second lower sliding plate is mounted on the top of the lower rotating plate through the second lower guiding rail; the second lower rack is fixed on the right side of the second lower sliding plate; the fourth lower servo motor is fixed below the top plate of the lower rotating plate, and the output end of the fourth lower servo motor is fixed with the second lower gear; the second lower gear is meshed with the second lower rack; the fourth lower bearing seat is fixed on the top of the second lower sliding plate; the fourth lower shaft is mounted inside the fourth lower bearing seat through the bearing; the fifth lower servo motor is fixed below the second lower sliding plate, and the output end of the fifth lower servo motor is connected with the lower part of the fourth lower shaft; the lower transition plate is fixed on the top of the fourth lower shaft; the second lower nozzle is fixed on the left side of the lower overturning plate; the lower overturning plate and the lower transition plate are connected by pins; the sixth lower servo motor is fixed on the side of the lower transition plate, and the output end of the sixth lower servo motor is connected with the lower overturning plate. The present device includes two cleaning systems, which are left and right symmetrical, for inner rim and back cavity.

The synchronous clamping drive system includes that: the first upper gear is fixed above the upper fixing plate; the left sliding plate is mounted above the upper fixing plate through the first upper guiding rail; the two left bearing seats are fixed above the left sliding plate; the two left shafts are mounted inside the left bearing seats through bearings; the right sliding plate is mounted above the upper fixing plate through the first upper guiding rail; the two right bearing seats are fixed above the right sliding plate; the two right shafts are mounted inside the right bearing seats through bearings; the upper part of the two left shafts and the upper part of the two right shafts are fixed with a V-type roller respectively; the sixth upper servo motor is fixed below the right sliding plate, and the output end of the sixth upper servo motor is hinged with the lower part of one of the right shafts; the second cylinder is fixed above the fixing plate, and the output end of the second cylinder is connected with the left sliding plate; and the lower parts of the left sliding plate and the right sliding plate are fixed with one of the first upper racks respectively, and the two first upper racks are meshed with the first upper gear at the same time.

The outer rim cleaning system includes that: the top of the upper vertical plate is mounted below the first upper rotating plate through the third upper guiding rail; the third upper rack is fixed on the left side of the top of the upper vertical plate; the second upper servo motor is fixed on the top of the first upper rotating plate, and the output end of the second upper servo motor is fixed with the third upper gear; the third upper gear is meshed with the third upper rack; the first upper sliding plate is mounted on the right side of the upper vertical plate through the second upper guiding rail; several first upper nozzles are fixed side by side on the first upper sliding plate; the second upper rack is fixed on the top of the first upper sliding plate; the first upper servo motor is fixed on the right side of the upper vertical plate, and the output end of the first upper servo motor is fixed with the second upper gear; and the second upper gear is meshed with the second upper rack. The present device includes two sets of outer rim cleaning system which are left and right symmetrical.

The bolt hole cleaning system includes that: the second upper sliding plate is mounted on the top of the first upper rotating plate through the fourth upper guiding rail; the second upper bearing seat is fixed below the second upper sliding plate; the second upper shaft is mounted inside the second upper bearing seat through a bearing; the second upper nozzle is fixed below the second upper shaft; the fourth upper servo motor is fixed on the top of the second upper sliding plate, and the output end of the fourth upper servo motor is connected with the top of the second upper shaft; the fourth upper rack is fixed on the right side of the second upper sliding plate; and the number of bolt hole cleaning systems included in present device corresponds to the number of wheel bolt holes.

The fifth upper servo motor is fixed at the center of the top of the first upper rotating plate through a transition flange, and the output end of the fifth upper servo motor is fixed with the fourth upper gear; and the fourth upper gear is meshed with each of fourth upper racks at the same time.

The upper lifting rotation system includes that: the first upper rotating plate is fixed below the second upper rotating plate through the transition block; the first upper bearing seat is fixed below the upper lifting plate; the first upper shaft is mounted inside the first upper bearing seat through a bearing; the four upper guiding pillars are fixed on the top of the upper lifting plate; the four upper guiding sleeves matched with the four upper guiding pillars are fixed on the top of the frame; and the two second servo electric cylinders are also fixed on the top of the frame, and the output ends of the two second servo electric cylinders are hinged with the upper part of the upper lifting plate; the fourth pulley is fixed on the top of the first upper shaft; the third upper servo motor is fixed on the top of the upper lifting plate through a transition flange, and the output end of the third upper servo motor is fixed with the third pulley; the third pulley and the fourth pulley are connected through the second synchronous belt; and the second upper rotating plate is fixed below the first upper shaft.

During operation, the second cylinder makes the four V-type rollers clamp the wheel synchronously through the first upper gear, the first upper rack and the first upper guiding rail; the sixth upper servo motor makes the clamped wheel rotate; the first cylinder lifts the first lower nozzles and the second lower nozzles etc. to a certain height through the lower guiding pillars and the lower guiding sleeves; the second lower servo motor makes the first lower nozzles rotate through the second lower shaft; the first servo electric cylinder precisely lifts the first lower nozzle to the center hole of the wheel by lifting frame, so that the center hole may be cleaned.

The seventh lower servo motor may accurately regulate the upper and lower heights of the second lower nozzles through the first lower gear, the first lower rack and the first lower guiding rail; the fourth lower servo motor may accurately regulate the horizontal positions of the second lower nozzles through the second lower gear, the second lower rack and the second lower guiding rail; the fifth lower servo motor may regulate the horizontal angles of the second lower nozzles through the fourth lower shaft; the sixth lower servo motor may regulate the injection angles of the second lower nozzles in the vertical direction through the lower overturning plate; the third lower servo motor may regulate the injection angles of the second lower nozzle in the horizontal direction through the third lower shaft; and the first lower servo motor may drive the first lower shaft and the second lower nozzles to rotate rapidly in the circumferential direction through the first pulley, the second pulley and the first synchronous belt.

The second servo motor cylinder may make the first upper nozzles and second upper nozzle initially drop to the appropriate positions through the upper guiding pillars and the upper guiding sleeves; the second upper servo motor may accurately regulate the horizontal positions of the first upper nozzles through the third upper gear, the third upper rack and the third upper guiding rail; the first upper servo motor may accurately regulate the vertical positions of the first upper nozzles through the second upper gear, the second upper rack and the second upper guiding rail; the fourth upper servo motor may drive the second upper nozzle to rotate through the second upper shaft; the fifth upper servo motor may accurately regulate the position of each of second upper nozzles according to the pitch diameter of bolt hole of the wheel through the fourth upper rack, the fourth upper gear and the fourth upper guiding rail; the third upper servo motor may make the first upper nozzles and the second upper nozzle rotate through the third pulley, the fourth pulley and the second synchronous belt; and each bolt hole and the outer rim of wheel may be cleaned.

In use, the present application may not only separately clean the center hole, the bolt hole, the inner rim and the outer rim of the wheel, but also may regulate the position and the angle of each nozzle according to the diameter and the height of the wheel; at the same time, it has the characteristics of high automation, powerful function, advanced technology, strong versatility and safe and stable performance.

In which, 1—frame, 2—second lower servo motor, 3—lower guiding pillar, 4—lower guiding sleeve, 5—lower fixing plate, 6—first pulley, 7—first synchronous belt, 8—second pulley, 9—lower lifting plate, 10—first lower shaft, 11—first lower bearing seat, 12—first servo electric cylinder, 13—lifting frame, 14—second lower servo motor, 15—second lower shaft, 16—second lower bearing seat, 17—first lower nozzle, 18—first lower rack, 19—first lower gear, 20—first lower guiding rail, 21—seventh lower servo motor, 22—first lower sliding plate, 23—third lower servo motor, 24—lower side plate, 25—third lower bearing seat, 26—third lower shaft, 27—lower rotating plate, 28—fourth lower servo motor, 29—second lower guiding rail, 30—fifth lower servo motor, 31—second lower sliding plate, 32—fourth lower shaft, 33—fourth lower bearing seat, 34—second lower nozzle, 35—lower turning plate, 36—lower transition plate, 37—sixth lower servo motor, 38—second lower rack, 39—second lower gear, 40—second cylinder, 41—upper fixing plate, 42—first upper rack, 43—first upper guiding rail, 44—left sliding plate, 45—left bearing seat, 46—left shaft, 47—V—type roller, 48—upper vertical plate, 49—second upper guiding rail, 50—first upper sliding plate, 51—first upper nozzle, 52—second upper rack 53—second upper gear, 54—first upper servo motor, 55—third upper guiding rail, 56—third upper gear, 57—third upper rack, 58—first upper rotating plate, 59—second upper servo motor, 60—transition block, 61—second upper rotating plate, 62—first upper shaft, 63—first upper bearing seat, 64—upper lifting plate, 65—upper guiding pillar, 66—upper guiding sleeve, 67—third pulley, 68—third upper servo motor, 69—second synchronous belt, 70—fourth pulley, 71—second servo electric cylinders, 72—second upper nozzle, 73—second upper shaft, 74—second upper bearing seat, 75—second upper sliding plate, 76—fourth upper guiding rail, 77—fourth upper servo motor, 78—fourth upper rack, 79—fourth upper gear, 80—fifth upper servo motor, 81—first upper gear, 82—right shaft, 83—right bearing seat, 84—right sliding plate, 85—sixth upper servo motor, 86—first cylinders.

DETAILED DESCRIPTION OF THE INVENTION

The details and operation conditions of the specific device of the present application are given below in conjunction with the illustration of the accompanying drawings.

Figure 1:
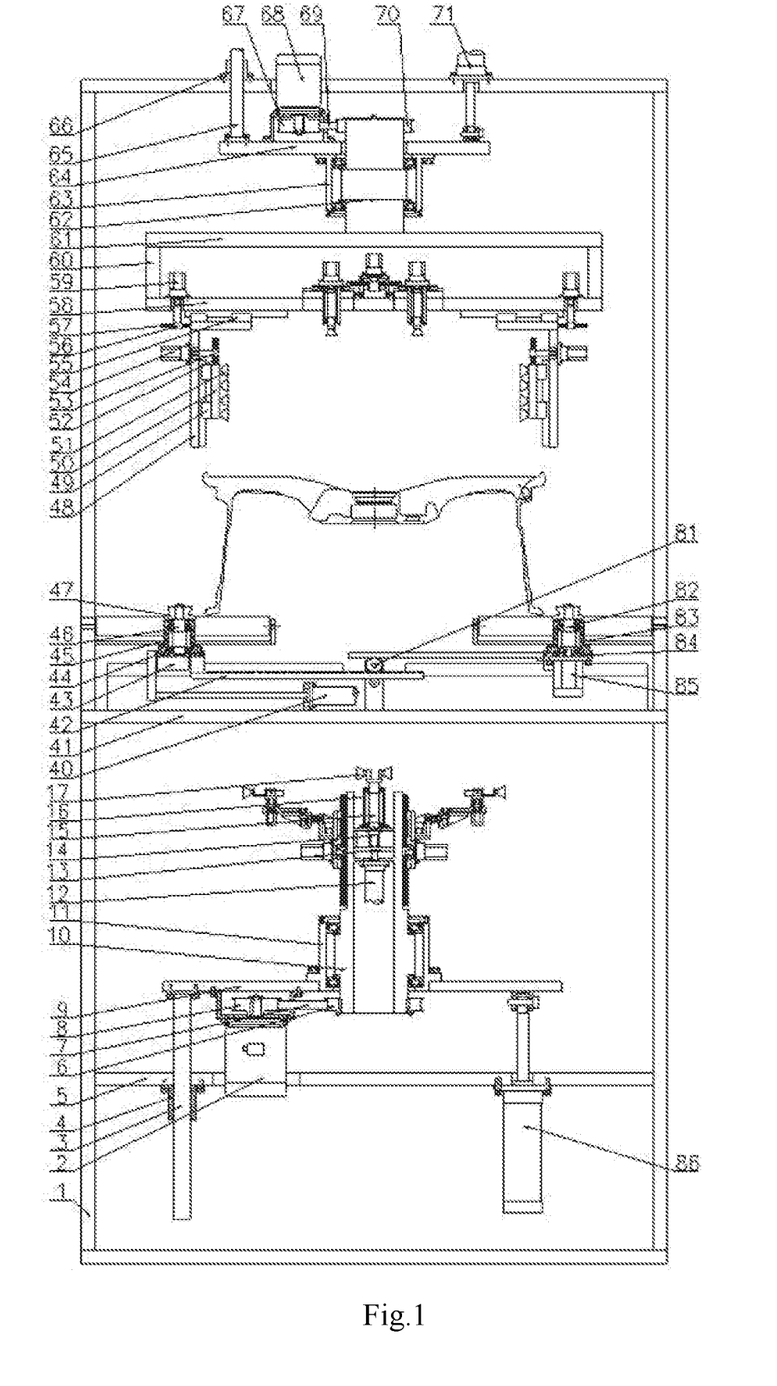
FIG. 1 is the front view of a wheel cleaning device of the present application.
Figure 2:
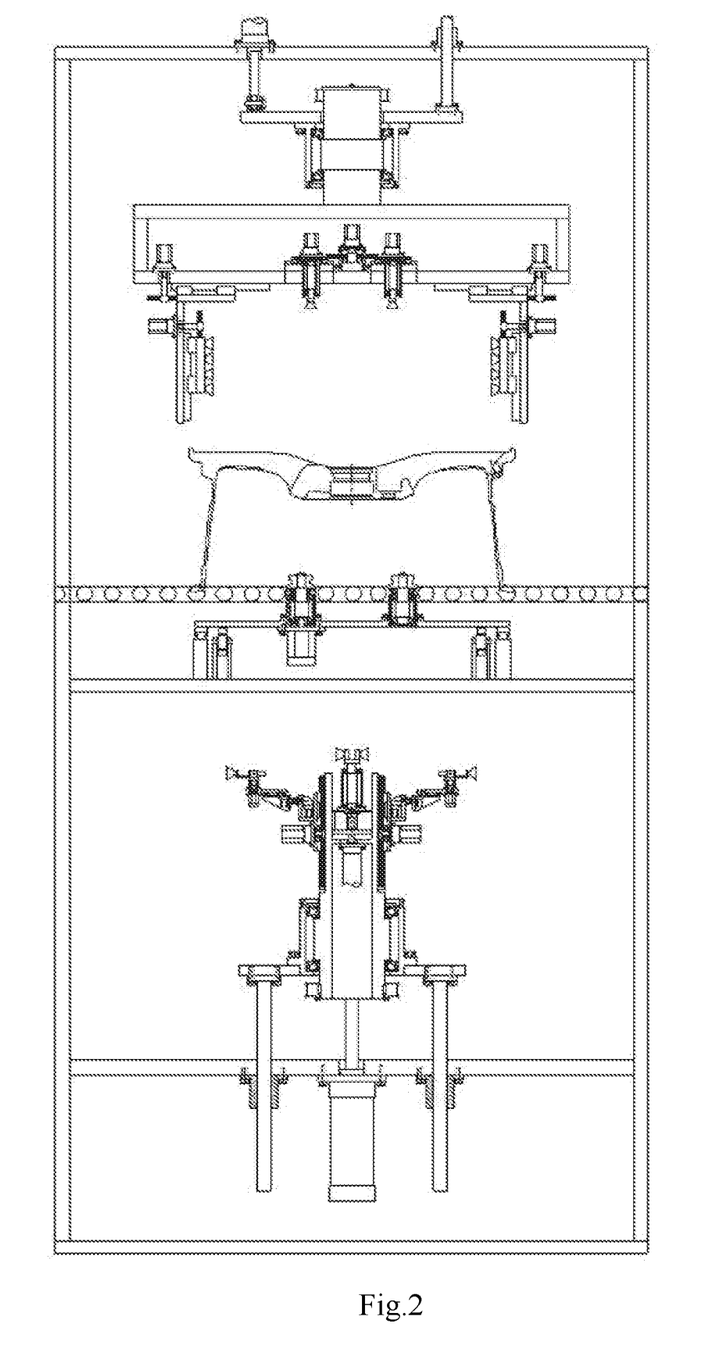
FIG. 2 is the left view of a wheel cleaning device of the present application.

The device is composed of a frame 1, a second lower servo motor 2, lower guiding pillars 3, lower guiding sleeves 4, a lower fixing plate 5, a first pulley 6, a first synchronous belt 7, a second pulley 8, a lower lifting plate 9, a first lower shaft 10, a first lower bearing seat 11, a first servo electric cylinder 12, a lifting frame 13, a second lower servo motor 14, a second lower shaft 15, a second lower bearing seat 16, first lower nozzles 17, a first lower rack 18, a first lower gear 19, a first lower guiding rail 20, a seventh lower servo motor 21, a first lower sliding plate 22, a third lower servo motor 23, a lower side plate 24, a third lower bearing seat 25, a third lower shaft 26, a lower rotating plate 27, a fourth lower servo motor 28, a second lower guiding rail 29, a fifth lower servo motor 30, a second lower sliding plate 31, a fourth lower shaft 32, a fourth lower bearing seat 33, a second lower nozzle 34, a lower turning plate 35, a lower transition plate 36, a sixth lower servo motor 37, a second lower rack 38, a second lower gear 39, a second cylinder 40, an upper fixing plate 41, first upper racks 42, an first upper guiding rail 43, a left sliding plate 44, left bearing seats 45, left shafts 46, V-type rollers 47, an upper vertical plate 48, a second upper guiding rail 49, a first upper sliding plate 50, first upper nozzles 51, a second upper rack 52, an upper gear 53, a first upper servo motor 54, a third upper guiding rail 55, a third upper gear 56, a third upper rack 57, a first upper rotating plate 58, a second upper servo motor 59, a transition block 60, a second upper rotating plate 61, a first upper shaft 62, a first upper bearing seat 63, an upper lifting plate 64, upper guiding pillars 65, upper guiding sleeves 66, a third pulley 67, a third upper servo motor 68, a second synchronous belt 69, a fourth pulley 70, second servo electric cylinders 71, second upper nozzles 72, a second upper shaft 73, a second upper bearing seat 74, a second upper sliding plate 75, a fourth upper guiding rail 76, a fourth upper servo motor 77, fourth upper racks 78, a fourth upper gear 79, a fifth upper servo motor 80, a first upper gear 81, right shafts 82, right bearing seats 83, a right sliding plate 84, a sixth upper servo motor 85 and first cylinders 86.

The lower lifting-rotating system includes that: the two first cylinders 86 and the four lower guiding sleeves 4 are fixed below the lower fixing plate 5; the output ends of the first cylinders 86 are hinged with the lower part of the lower lifting plate 9; the four lower guiding pillars 3 matched with the lower guiding sleeves 4 are fixed below the lower lifting plate 9; the first lower servo motor 2 is fixed below the lower lifting plate 9 through a transition flange, and the output end of the first lower servo motor 2 is fixed with the second pulley 8; the first lower bearing seat 11 is fixed on the top of the lower lifting plate 9; the first lower shaft 10 is mounted inside the first lower bearing seat 11 through a bearing; the lower end of the first lower shaft 10 is fixed with the first pulley 6; and the first pulley 6 and the second pulley 8 are connected by the first synchronous belt 7.

The central hole cleaning system includes that: the first servo electric cylinder 12 is fixed at the central part of the first lower shaft 10, and the output end of the first servo electric cylinder 12 is connected with the bottom plate of the lifting frame 13; the second lower bearing seat 16 is fixed above the top plate of the lifting frame 13; the second lower shaft 15 is mounted inside the second lower bearing seat 16 through a bearing; the second lower servo motor 14 is fixed below the top plate of the lifting frame 13, and the output end of the second lower servo motor 14 is connected with the lower end of the second lower shaft 15; and the two symmetrical first lower nozzles 17 are fixed on the top of the second lower shaft 15.

Figure 3:
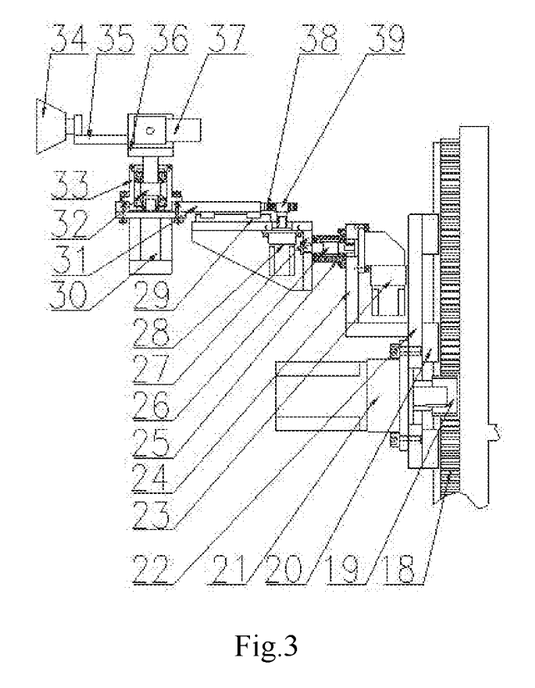
FIG. 3 is the front view of the inner rim and back cavity cleaning system of the wheel cleaning device of the present application.

The cleaning system for inner rim and back cavity includes that: the first lower sliding plate 22 is mounted on the left side of the first lower shaft 10 through the first lower guiding rail 20; the first lower rack 18 is also fixed on the left side of the first lower shaft 10; the seventh lower servo motor 21 is fixed on the right side of the first lower sliding plate 22,and the output end of the seventh lower servo motor 21 is fixed with the first lower gear 19; the first lower gear 19 is meshed with the first lower rack 18; the lower side plate 24 is fixed on the left side of the first lower sliding plate 22; the third lower bearing seat 25 is fixed on the left side of the lower plate 24; the third lower shaft 26 is mounted inside the third lower bearing seat 25 through a bearing; the third lower servo motor 23 is fixed on the right side of the lower plate 24, and the output end of the third lower servo motor 23is connected with the right side of the third lower shaft 26; the lower rotating plate 27 is fixed on the left side of the third lower shaft 26; the second lower sliding plate 31 is mounted on the top of the lower rotating plate 27 through the second lower guiding rail 29; the second lower rack 38 is fixed on the right side of the second lower sliding plate 31;the fourth lower servo motor 28 is fixed below the top plate of the lower rotating plate 27, and the output end of the fourth lower servo motor 28 is fixed with the second lower gear 39; the second lower gear 39 is meshed with the second lower rack 38; the fourth lower bearing seat 33 is fixed on the top of the second lower sliding plate 31; the fourth lower shaft 32 is mounted inside the fourth lower bearing seat 33 through the bearing; the fifth lower servo motor 30 is fixed below the second lower sliding plate 31, and the output end of the fifth lower servo motor 30 is connected with the lower part of the fourth lower shaft 32; the lower transition plate 36 is fixed on the top of the fourth lower shaft 32; the second lower nozzle 34 is fixed on the left side of the lower overturning plate 35; the lower overturning plate 35 and the lower transition plate 36 are connected by pins; the sixth lower servo motor 37 is fixed on the side of the lower transition plate 36, and the output end of the sixth lower servo motor 37 is connected with the lower overturning plate 35. The present device includes two cleaning systems, which are left and right symmetrical, for inner rim and back cavity.

The synchronous clamping drive system includes that: the first upper gear 81 is fixed above the upper fixing plate 41; the left sliding plate 44 is mounted above the upper fixing plate 41 through the first upper guiding rail 43; the two left bearing seats 45 are fixed above the left sliding plate 44; the two left shafts 46 are mounted inside the left bearing seats 45 through bearings; the right sliding plate 84 is mounted above the upper fixing plate 41 through the first upper guiding rail 43; the two right bearing seats 83 are fixed above the right sliding plate 84; the two right shafts 82 are mounted inside the right bearing seats 83 through bearings; the upper part of the two left shafts 46 and the upper part of the two right shafts 82 are fixed with a V-type roller 47, respectively; the sixth upper servo motor 85 is fixed below the right sliding plate 84, and the output end of the sixth upper servo motor 85 is hinged with the lower part of one of the right shafts 82; the second cylinder 40 is fixed above the fixing plate 41, and the output end of the second cylinder 40 is connected with the left sliding plate 44; and the lower parts of the left sliding plate 44 and the right sliding plate 84 are fixed with one first upper rack 42 respectively, and the two first upper rack 42 are meshed with the first upper gear 81 at the same time.

The outer rim cleaning system includes that: the top of the upper vertical plate 48 is mounted below the first upper rotating plate 58 through the third upper guiding rail 55; the third upper rack 57 is fixed on the left side of the top of the upper vertical plate 48; the second upper servo motor 59 is fixed on the top of the first upper rotating plate 58, and the output end of the second upper servo motor 59is fixed with the third upper gear 56; the third upper gear 56 is meshed with the third upper rack 57; the first upper sliding plate 50 is mounted on the right side of the upper vertical plate 48 through the second upper guiding rail 49; several first upper nozzles 51 are fixed side by side on the first upper sliding plate 50; the second upper rack 52 is fixed on the top of the first upper sliding plate 50; the first upper servo motor 54 is fixed on the right side of the upper vertical plate 48, and the output end of the first upper servo motor 54 is fixed with the second upper gear 53; and the second upper gear 53 is meshed with the second upper rack 52. The present device includes two sets of outer rim cleaning system which are left and right symmetrical.

Figure 4:
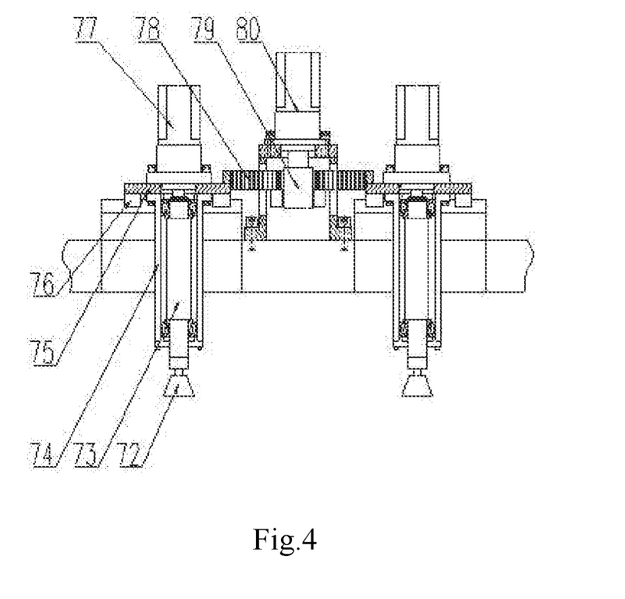
FIG. 4 is the front view of the bolt hole cleaning system of the wheel cleaning device of the present application.

The bolt hole cleaning system includes that: the second upper sliding plate 75 is mounted on the top of the first upper rotating plate 58 through the fourth upper guiding rail 76; the second upper bearing seat 74 is fixed below the second upper sliding plate 75; the second upper shaft 73 is mounted inside the second upper bearing seat 74 through a bearing; the second upper nozzle 72 is fixed below the second upper shaft 73; the fourth upper servo motor 77 is fixed on the top of the second upper sliding plate 75, and the output end of the fourth upper servo motor 77 is connected with the top of the second upper shaft 73; the fourth upper rack 78 is fixed on the right side of the second upper sliding plate 75; and the number of bolt hole cleaning systems included in the present device corresponds to the number of wheel bolt holes.

The fifth upper servo motor 80 is fixed at the center of the top of the first upper rotating plate 58 through a transition flange, and the output end of the fifth upper servo motor 80 is fixed with the fourth upper gear 79; and the fourth upper gear 79 is meshed with each fourth upper rack 78 at the same time.

The upper lifting rotation system includes that: the first upper rotating plate 58 is fixed below the second upper rotating plate 61 through the transition block 60; the first upper bearing seat 63 is fixed below the upper lifting plate 64; the first upper shaft 62 is mounted inside the first upper bearing seat 63 through a bearing; the four upper guiding pillars 65 are fixed on the top of the upper lifting plate 64; the four upper guiding sleeves 66 matched with the four upper guiding pillars 65 are fixed on the top of the frame 1; and the two second servo electric cylinder 71 are also fixed on the top of the frame 1, and the output ends of the two servo electric cylinder 71 are hinged with the upper part of the upper lifting plate 64; the fourth pulley 70 is fixed on the top of the first upper shaft 62; the third upper servo motor 68 is fixed on the top of the upper lifting plate 64 through a transition flange, and the output end of the third upper servo motor 68 is fixed with the third pulley 67; the third pulley 67 and the fourth pulley 70 are connected through the second synchronous belt 69; and the second upper rotating plate 61 is fixed below the first upper shaft 62.

During operation, the second cylinder 40 makes the four V-type rollers 47 clamp the wheel synchronously through the first upper gear 81, the first upper rack 42 and the first upper guiding rail 43; the sixth upper servo motor 85 makes the clamped wheel rotate; the first cylinders lift the first lower nozzles 17 and the second lower nozzles 34 etc. to a certain height through the lower guiding pillars 3 and the lower guiding sleeves 4; the second lower servo motor 14 makes the first lower nozzles 17 rotate through the second lower shaft 15; the first servo electric cylinder 12 precisely lifts the first lower nozzle 17 to the center hole of the wheel by lifting frame 13, so that the center hole may be cleaned.

The seventh lower servo motor 21 may accurately regulate the upper and lower heights of the second lower nozzles 34 through the first lower gear 19, the first lower rack 18 and the first lower guiding rail 20; the fourth lower servo motor 28 may accurately regulate the horizontal positions of the second lower nozzles 34 through the second lower gear 39, the second lower rack 38 and the second lower guiding rail 29; the fifth lower servo motor 30 may regulate the horizontal angles of the second lower nozzles 34 through the fourth lower shaft 32; the sixth lower servo motor 37 may regulate the injection angles of the second lower nozzles 34 in the vertical direction through the lower overturning plate 35; the third lower servo motor 23 may regulate the injection angles of the second lower nozzle 34 in the horizontal direction through the third lower shaft 26; and the first lower servo motor 2 may drive the first lower shaft 10 and the second lower nozzles 34 to rotate rapidly in the circumferential direction through the first pulley 6, the second pulley 8 and the first synchronous belt 7.

The second servo motor cylinder 71 may make the first upper nozzles 51 and second upper nozzles 72 initially drop to the appropriate positions through the upper guiding pillars 65 and the upper guiding sleeves 66; the second upper servo motor 59 may accurately regulate the horizontal positions of the first upper nozzles 51 through the third upper gear 56, the third upper rack 57 and the third upper guiding rail 55; the first upper servo motor 54 may accurately regulate the vertical positions of the first upper nozzles 51 through the second upper gear 53, the second upper rack 52 and the second upper guiding rail 49; the fourth upper servo motor 77 may drive the second upper nozzles 72 to rotate through the second upper shaft 73; the fifth upper servo motor 80 may accurately regulate the position of each of second upper nozzles 72 according to the pitch diameter of bolt hole of the wheel through the fourth upper rack 78, the fourth upper gear 79 and the fourth upper guiding rail 76; the third upper servo motor 68 may make the first upper nozzles 51 and the second upper nozzles 72 rotate through the third pulley 67, the fourth pulley 70 and the second synchronous belt 69; and each bolt hole and the outer rim of wheel may be cleaned.

The foregoing descriptions of specific exemplary embodiments of the present application have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wheel cleaning device, comprising a frame, a first lower servo motor, lower guiding pillars, lower guiding sleeves, a lower fixing plate, a first pulley, a first synchronous belt, a second pulley, a lower lifting plate, a first lower shaft, a first lower bearing seat, a first servo electric cylinder, a lifting frame, a second lower servo motor, a second lower shaft, a second lower bearing seat, first lower nozzles, a first lower rack, a first lower gear, a first lower guiding rail, a seventh lower servo motor, a first lower sliding plate, a third lower servo motor, a lower side plate, a third lower bearing seat, a third lower shaft, a lower rotating plate, a fourth lower servo motor, a second lower guiding rail, a fifth lower servo motor, a second lower sliding plate, a fourth lower shaft, a fourth lower bearing seat, a second lower nozzle, a lower turning plate, a lower transition plate, a sixth lower servo motor, a second lower rack, a second lower gear, a second cylinder, an upper fixing plate, first upper racks, a first upper guiding rail, a left sliding plate, left bearing seats, left shafts, V-type rollers, an upper vertical plate, a second upper guiding rail, a first upper sliding plate, first upper nozzles, a second upper rack, an upper gear, a first upper servo motor, an third upper guiding rail, a third upper gear, a third upper rack, a first upper rotating plate, a second upper servo motor, a transition block, a second upper rotating plate, a first upper shaft, a first upper bearing seat, an upper lifting plate, upper guiding pillars, upper guiding sleeves, a third pulley, a third upper servo motor, a second synchronous belt, a fourth pulley, second servo electric cylinders, second upper nozzles, a second upper shaft, a second upper bearing seat, a second upper sliding plate, a fourth upper guiding rail, a fourth upper servo motor, fourth upper racks, a fourth upper gear, a fifth upper servo motor, a first upper gear, right shafts, right bearing seats, a right sliding plate, a sixth upper servo motor and first cylinders, wherein, the wheel cleaning device further comprises a lower lifting-rotating system, a central hole cleaning system, a cleaning system for inner rim and back cavity, a synchronous clamping drive system, an outer rim cleaning system, a bolt hole cleaning system and an upper lifting rotation system;

the lower lifting-rotating system includes that: two first cylinders and four lower guiding sleeves are fixed below the lower fixing plate; an output ends of the first cylinders are hinged with the lower part of the lower lifting plate; four lower guiding pillars matched with the lower guiding sleeves are fixed below the lower lifting plate; the first lower servo motor is fixed below the lower lifting plate through a transition flange, and an output end of the first lower servo motor is fixed with the second pulley; the first lower bearing seat is fixed on the top of the lower lifting plate; the first lower shaft is mounted inside the first lower bearing seat through a bearing; the lower end of the first lower shaft is fixed with the first pulley; and the first pulley and the second pulley are connected by the first synchronous belt;

the central hole cleaning system includes that: the first servo electric cylinder is fixed at the central part of the first lower shaft, and an output end of the first servo electric cylinder is connected with the bottom plate of the lifting frame; the second lower bearing seat is fixed above the top plate of the lifting frame; the second lower shaft is mounted inside the second lower bearing seat through a bearing; the second lower servo motor is fixed below the top plate of the lifting frame, and an output end of the second lower servo motor is connected with the lower end of the second lower shaft; and two symmetrical first lower nozzles are fixed on the top of the second lower shaft;

the cleaning system for inner rim and back cavity includes that: the first lower sliding plate is mounted on the left side of the first lower shaft through the first lower guiding rail; the first lower rack is also fixed on the left side of the first lower shaft; the seventh lower servo motor is fixed on the right side of the first lower sliding plate, and an output end of the seventh lower servo motor is fixed with the first lower gear; the first lower gear is meshed with the first lower rack; the lower side plate is fixed on the left side of the first lower sliding plate; the third lower bearing seat is fixed on the left side of the lower plate; the third lower shaft is mounted inside the third lower bearing seat through a bearing; the third lower servo motor is fixed on the right side of the lower plate, and an output end of the third lower servo motor is connected with the right side of the third lower shaft; the lower rotating plate is fixed on the left side of the third lower shaft; the second lower sliding plate is mounted on the top of the lower rotating plate through the second lower guiding rail; the second lower rack is fixed on the right side of the second lower sliding plate; the fourth lower servo motor is fixed below the top plate of the lower rotating plate, and an output end of the fourth lower servo motor is fixed with the second lower gear; the second lower gear is meshed with the second lower rack; the fourth lower bearing seat is fixed on the top of the second lower sliding plate; the fourth lower shaft is mounted inside the fourth lower bearing seat through the bearing; the fifth lower servo motor is fixed below the second lower sliding plate, and an output end of the fifth lower servo motor is connected with the lower part of the fourth lower shaft; the lower transition plate is fixed on the top of the fourth lower shaft; the second lower nozzle is fixed on the left side of the lower overturning plate; the lower overturning plate and the lower transition plate are connected by pins; the sixth lower servo motor is fixed on the side of the lower transition plate, and an output end of the sixth lower servo motor is connected with the lower overturning plate; the present device includes two cleaning systems, which are left and right symmetrical, for inner rim and back cavity;

the synchronous clamping drive system includes that: the first upper gear is fixed above the upper fixing plate; the left sliding plate is mounted above the upper fixing plate through the first upper guiding rail; the two left bearing seats are fixed above the left sliding plate; the two left shafts are mounted inside the left bearing seats through bearings; the right sliding plate is mounted above the upper fixing plate through the first upper guiding rail; the two right bearing seats are fixed above the right sliding plate; the two right shafts are mounted inside the right bearing seats through bearings; the upper part of the two left shafts and the upper part of the two right shafts are fixed with a V-type roller respectively; the sixth upper servo motor is fixed below the right sliding plate, and an output end of the sixth upper servo motor is hinged with the lower part of one of the right shafts; the second cylinder is fixed above the fixing plate, and an output end of the second cylinder is connected with the left sliding plate; and the lower parts of the left sliding plate and the right sliding plate are fixed with one of the first upper racks respectively, and the two first upper racks are meshed with the first upper gear at the same time;

the outer rim cleaning system includes that: the top of the upper vertical plate is mounted below the first upper rotating plate through the third upper guiding rail; the third upper rack is fixed on the left side of the top of the upper vertical plate; the second upper servo motor is fixed on the top of the first upper rotating plate, and an output end of the second upper servo motor is fixed with the third upper gear; the third upper gear is meshed with the third upper rack; the first upper sliding plate is mounted on the right side of the upper vertical plate through the second upper guiding rail; several first upper nozzles are fixed side by side on the first upper sliding plate; the second upper rack is fixed on the top of the first upper sliding plate; the first upper servo motor is fixed on the right side of the upper vertical plate, and an output end of the first upper servo motor is fixed with the second upper gear; and the second upper gear is meshed with the second upper rack; the present device includes two sets of outer rim cleaning system which are left and right symmetrical;

the bolt hole cleaning system includes that: the second upper sliding plate is mounted on the top of the first upper rotating plate through the fourth upper guiding rail; the second upper bearing seat is fixed below the second upper sliding plate; the second upper shaft is mounted inside the second upper bearing seat through a bearing; the second upper nozzle is fixed below the second upper shaft; the fourth upper servo motor is fixed on the top of the second upper sliding plate, and an output end of the fourth upper servo motor is connected with the top of the second upper shaft; the fourth upper rack is fixed on the right side of the second upper sliding plate; and the number of bolt hole cleaning systems included in present device corresponds to the number of wheel bolt holes;

the fifth upper servo motor is fixed at the center of the top of the first upper rotating plate through a transition flange, and an output end of the fifth upper servo motor is fixed with the fourth upper gear; and the fourth upper gear is meshed with each of fourth upper racks at the same time;

the upper lifting rotation system includes that: the first upper rotating plate is fixed below the second upper rotating plate through the transition block; the first upper bearing seat is fixed below the upper lifting plate; the first upper shaft is mounted inside the first upper bearing seat through a bearing; the four upper guiding pillars are fixed on the top of the upper lifting plate; the four upper guiding sleeves matched with the four upper guiding pillars are fixed on the top of the frame; and two second servo electric cylinders are also fixed on the top of the frame, and output ends of the two second servo electric cylinders are hinged with the upper part of the upper lifting plate; the fourth pulley is fixed on the top of the first upper shaft; the third upper servo motor is fixed on the top of the upper lifting plate through a transition flange, and an output end of the third upper servo motor is fixed with the third pulley; the third pulley and the fourth pulley are connected through the second synchronous belt; and the second upper rotating plate is fixed below the first upper shaft.

* * * * *